United States Patent Office
3,674,410
Patented July 4, 1972

3,674,410
APPARATUS FOR CONTROLLING THE OPERA-
TION OF FUEL BURNERS
Kenneth R. Wade, Burscough, near Ormskirk, England,
assignor to United Gas Industries Limited, London,
England
Filed July 21, 1970, Ser. No. 56,917
Claims priority, application Great Britain, Aug. 28, 1969,
42,830/69
Int. Cl. F23n 5/00
U.S. Cl. 431—74                                    5 Claims

ABSTRACT OF THE DISCLOSURE

The invention provides a burner control apparatus in which operation of a valve supplying a main fuel burner, and operation of a spark ignition circuit for the burner or a pilot burner, adjacent to the main burner, are both controlled by a single gate-controlled switching device, preferably a thyristor, under control of a flame detector device arranged to detect the presence of a flame at the respective main or pilot burner.

---

This invention relates to apparatus for controlling the operation of fuel burners, more particularly gas burners.

It has been proposed to operate a gas flow control by means of a solid state switching device. In addition it is known to provide an ignition circuit in which generation of a spark from an alternating current supply is initiated by a solid state switching device.

The present invention provides an apparatus for controlling a fuel burner in which operation of a fuel valve supplying the burner and operation of a spark ignition circuit are controlled by means of a single gate-controlled switching device, preferably a solid state switching device.

The apparatus preferably includes a flame detector device which is responsive to the absence of a flame at a burner to close said fuel valve. Said burner may comprise a main burner or a pilot burner arranged for ignition of fuel supplied to the main burner.

The flame detector device is preferably also effective in response to the presence of a flame at a main or pilot burner to render the spark ignition circuit inoperative, preferably by providing a gating control signal to the said gate-controlled switching device.

According therefore to a preferred embodiment of the invention there is provided an apparatus for controlling the operation of a fuel burner comprising an electrical valve actuator for controlling a fuel supply valve for the main burner, a spark ignition circuit connected to a spark gap arranged adjacent the main burner, or a pilot burner adjacent the main burner, for ignition fuel supplied thereto, a gate-controlled solid state switching device connected in a control circuit with the valve actuator and the spark ignition circuit, said switching device being operable to energise said spark ignition circuit at intervals from an alternating supply voltage, and a flame detector devce effective in response to the presence of a flame at the burner adjacent which the spark gap is disposed to supply a gating signal to the switching device so as to maintain the latter closed, effectively preventing further energisation of the spark gap, whilst operating the valve actuator to supply fuel to the main burner.

By employing a single solid state switching device the invention affords a considerable economy as compared with apparatus in which separate solid state devices and/or relays are provided for valve control, ignition control and flame detection. The switching device is preferably a semiconductor controlled rectifier or thyristor.

Preferably the spark ignition circuit includes a step-up transformer the primary of which is connected in series with the switching device and a capacitor which is charged during alternate half-cycles of said alternating supply voltage through a half-wave rectifier, the spark gap being connected across the transformer secondary.

The control circuit preferably supplies an alternating gating current to the gate of the switching device in anti-phase to the alternating supply voltage for rendering the switching device conductive between each of said half cycles to discharge the capacitor through said transformer primary and thereby cause the generation of a spark, the said gating signal when provided by the flame detector device being superimposed on the alternating gating current to render the switching device conductive throughout the alternating supply cycle.

The electrical valve actuator preferably comprises a solenoid arranged in series with the half-wave rectifier so that energising current flows through the solenoid whenever the switching device is conductive during half-cycles of the alternating supply voltage cycle when the rectifier conduits. A smoothing capacitor is preferably connected across the solenoid to maintain energisation of the latter during alternate half-cycles when the rectifier is not conducting.

One embodiment of the invention will now be described, by way of example only, with reference to the accompanying drawings in which.

Figure 1:
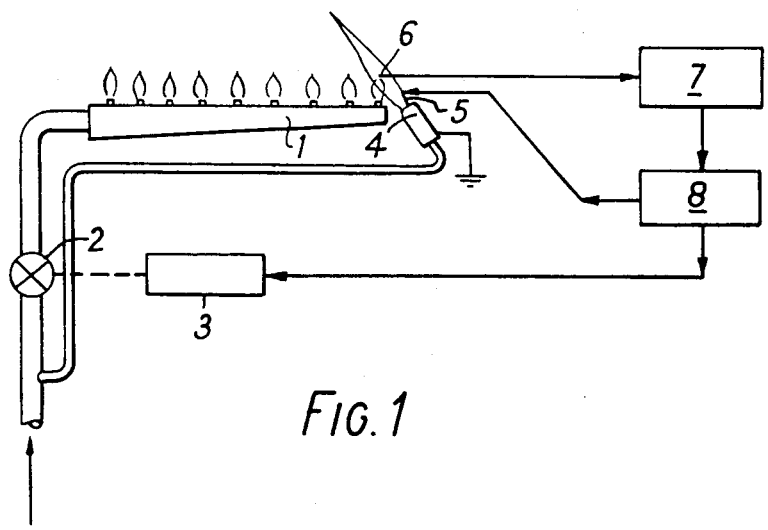
FIG. 1 illustrates a fuel burner control apparatus according to the invention in block schematic form.

The control apparatus according to the invention as illustrated in FIG. 1 is adapted to control the operation of a main gas burner 1 which is supplied with gas through a main fuel valve 2. The valve 2 is electrically operated by means of a solenoid 3, the valve 2 being open to admit gas to the burner when the solenoid 3 is energised.

A pilot burner 4 is mounted adjacent the main burner 1 so that when a flame is present at the pilot burner 4 it will ignite fuel issuing from the main burner 1.

A pair of fixed separated contacts defining a spark gap 5 is mounted adjacent the outlet of the pilot burner 4. One of these contacts may in fact comprise the body of the burner 4, which is earthed, as shown.

A flame detector probe 6 is mounted in the region occupied by the flame, when present, from the pilot burner 4. The probe 6 comprises one of a pair of spaced apart electrodes, the other of which is generally constituted by the earthed body of the burner 4 itself, between which a unidirectional conductive path is formed as a result of the rectifying effect of the ionisation existing in the pilot burner flame in operation of the burner 4.

The probe 6 is connected to a flame detector 7. The flame detector 7 is effective to provide an output voltage which exceeds a predetermined level when a flame is detected by the flame detector probe 6, this voltage being utilised as a gating signal in a control circuit 8 to control the operation of the valve actuating solenoid 3 and the energisation of the spark gap 5 as hereinafter described.

Figure 2:
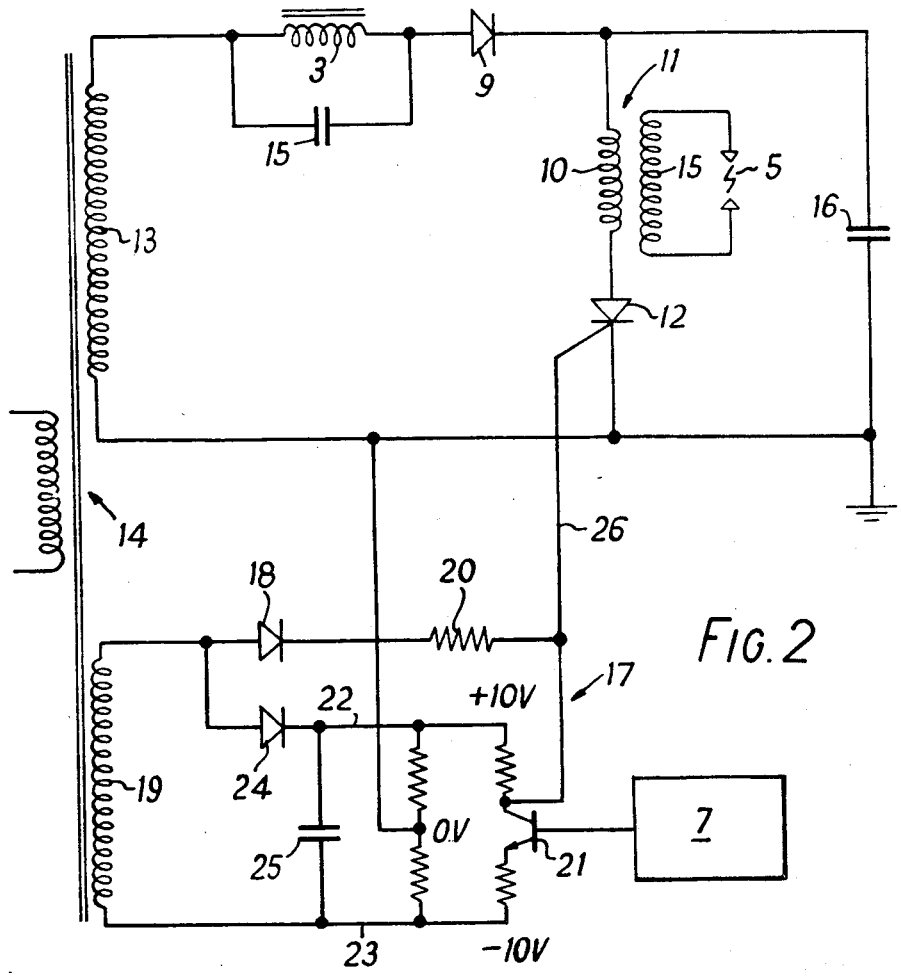
FIG. 2 is a circuit diagram of a fuel burner control apparatus according to one embodiment of the invention.

FIG. 2 is a circuit diagram of the apparatus schematically illustrated in FIG. 1. The valve actuating solenoid 3 is connected in a series circuit including a solid state diode half-wave rectifier element 9, a primary winding 10 of a step-up spark transformer 11, and a semiconductor controlled rectifier or thyristor 12, the forward direction of conduction of which is the same as that of the diode element 9. This series circuit is connected across an alternating supply voltage, provided by a secondary winding 13 of a supply transformer 14, and typically of the order of 120 volts.

A smoothing capacitor 15 is connected across the valve actuating solenoid 3 so as to ensure that, when a half-wave rectified voltage is applied to the said series circuit energisation of the solenoid 3 is maintained so as to maintain the associated valve 2 open without "chattering."

The electrodes forming the spark gap 5 are connected across the secondary winding 15 of the step-up transformer 11. Energy for the spark gap 5 is derived from charge stored in a capacitor 16 connected across the series combination of the transformer primary winding 10 and the thyristor 12, a spark being generated when the charged capacitor 16 is discharged through the primary winding 10 upon closure of the gate controlled solid state switch constituted by the thyristor.

The gate electrode of the thyristor 12 is connected to a gating control circuit 17. This circuit includes a diode rectifier element 18 connected to a further secondary winding 19 of the supply transformer 14 and arranged to supply a half-wave rectified gating current to the gate electrode of the thyristor 12 through a resistor 20. The transformer secondary winding 19 is arranged so that this gating current is in antiphase to the alternating voltage supplied by the transformer secondary winding 13, so that the thyristor 12 conducts between each successive half cycle of the half-wave rectified voltage across the secondary winding 13.

The flame detector 7 is operatively associated with the gating control circuit 17 and utilises the rectifying effect which occurs between relatively hot and relatively cool regions of the associated pilot burner flame, as sensed by the probe 6, to provide a direct output voltage the level of which is indicative of the presence or absence of a pilot flame. Some particularly suitable forms of flame detector for this purpose form the subject of the copending patent application Ser. No. 851,390.

In FIG. 2 the final output transistor 21 of the amplifier associated with the flame detector 7 is shown. This transistor 21 is connected across complementary supply lines 22, 23 carrying half-wave rectified alternating current derived from the winding 19 through a diode rectifier element 24 and smoothing capacitor 25, the lines 22, 23 being typically at mean voltages of +10 volts and —10 volts respectively. The biassing of the transistor 21 is such that an output line 26 connected to the collector of the output transistor 21 of the flame detector amplifier, is at substantially zero or negative potential in the absence of a flame, but rises to a positive potential upon detection of a flame at the pilot burner 4.

The output line 26 is connected to the gate electrode of the thyristor 12.

The operation of the apparatus will be described with reference to FIGS. 2 and 3. Initially, in the absence of a flame at the pilot burner 4, the capacitor 16 is charged to almost the peak voltage of the alternating supply during each positive half cycle of the supply curve (a) in FIG. 3, through the diode element 9. As the supply voltage falls from its peak positive amplitude, the capacitor 16 retains its charge, discharge thereof being prevented by the diode element 9, so that the voltage across the capacitor 16, curve (b), is maintained substantially constant. During the charging of capacitor 16, the current flowing through the valve actuating solenoid 3 is too low to open the valve 2.

Figure 3:
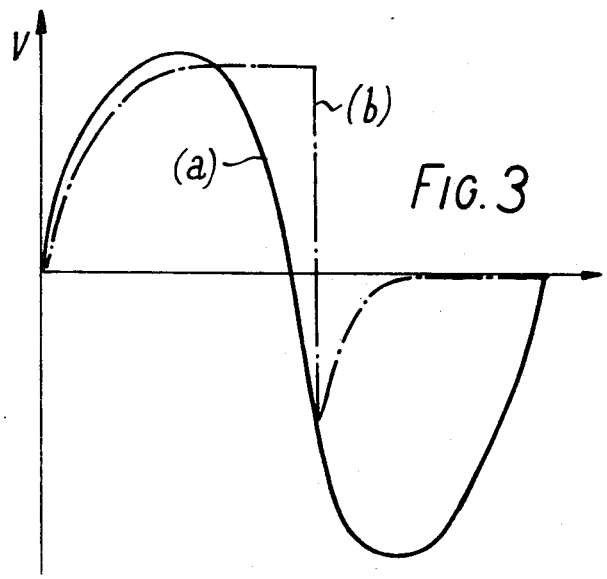
FIG. 3 illustrates graphically the waveform of the voltage across the capacitor 16 of the circuit of FIG. 2 in operation thereof in the absence of a detected flame.

Shortly after the commencement of the negative half cycle of the supply, the gating current supplied to the gate electrode of the thyristor 12 through the diode element 18 of the gating control circuit 17 causes the thyristor 12 to conduct, so that the capacitor 16 discharges rapidly through the primary winding 10 of the spark transformer 11, the voltage instantaneously developed across the winding 10 being sufficient to produce a spark at the gap 5, accompanied by a sharp collapse of the voltage across the capacitor 16, as shown in curve (b) of FIG. 3.

This sequence of events is repeated in each cycle of the alternating supply, so that one spark is produced at the gap 5 per cycle, until ignition occurs and a pilot flame appears at the pilot burner 4.

The presence of a pilot flame is immediately detected by the flame detector 7 and, as described above, a gating signal in the form of a steady positive potential is applied to the output line 26, superimposed on the aforesaid alternating gating current. In consequence the thyristor gate is held permanently open, so that the thyristor 12 acts as a simple diode element, and thereafter conducts during the positive half cycle of the supply voltage, preventing charging of the capacitor 16. The voltage across the transformer primary winding 10 is then never sufficient to cause firing of the spark gap 5, while the valve operating solenoid 3 becomes energised, opening the valve 2 to supply fuel to the main burner 1.

It will be seen that the invention provides a simple circuit which controls the gas valve operation and ignition spark generation from a single thyristor, and which also has the effect of stopping operation of the spark ignition circuit automatically when ignition has occurred.

In alternative embodiments of the invention, not illustrated, the pilot burner 4 may be dispensed with, the spark gap 5 of the ignition circuit being then located adjacent the outlet or an outlet of the main burner 1. With such an arrangement the main fuel valve 2 is initially opened for a short period, either automatically under electronic control, or by means of a manual pushbutton, and the spark gap 5 energised as described above: the thyristor 12 would in such an arrangement provide a holding current for the valve operating solenoid 3 to maintain the valve 2 open only when fired in response to a "flame present" signal from the flame detector 7, the latter being associated in this case with the main burner 1 itself.

I claim:

1. Burner control apparatus comprising a fuel supply line for connection to a burner, a fuel supply valve in said line, a spark gap for igniting said burner and electrical control means for connection to an A.C. supply to control an electrical valve actuator for said fuel valve and an energizing circuit for said spark gap including capacitor means; said electrical control means including, in series, said electrical valve actuator means, a half-wave rectifier, and a gate-controlled solid state switching device for, when conducting, completing said spark gap energizing circuit, and means for applying a gating signal to said switching device such that said switching device is conducting when said half-wave rectifier is non-conducting.

2. Burner control apparatus as claimed in claim 1, wherein the electrical valve actuator means comprises solenoid means and a smoothing capacitor is connected across the solenoid means to maintain actuation thereof during alternate half-cycles when the rectifier is non-conducting.

3. Burner control apparatus as claimed in claim 1, wherein said means for applying a gating signal includes a transformer connected to supply a signal in antiphase to the A.C. supply and a second half-wave rectifier.

4. Burner control apparatus as claimed in claim 3 further comprising flame detector means connected to apply a superimposed gating signal to said switching device such as to maintain said switch permanently conducting when a flame is detected.

5. Burner control apparatus as claimed in claim 4, wherein said switching device comprises a thyristor.

References Cited
UNITED STATES PATENTS

| | | | |
|---|---|---|---|
| 3,519,376 | 7/1970 | Dietz | 431—46 X |
| 3,393,039 | 7/1968 | Eldridge et al. | 431—74 X |
| 3,447,880 | 6/1969 | Potts et al. | 431—46 X |
| 3,445,173 | 5/1969 | Malavasi et al. | 431—25 |
| 3,291,183 | 12/1966 | Fairley | 431—74 X |

CARROLL B. DORITY, JR., Primary Examiner

U.S. Cl. X.R.

431—78